(12) United States Patent
Jung et al.

(10) Patent No.: US 8,254,923 B2
(45) Date of Patent: Aug. 28, 2012

(54) METHOD AND APPARATUS FOR PERFORMING CELL SELECTION IN WIRELESS COMMUNICATION SYSTEM

(75) Inventors: SungHoon Jung, Seoul (KR); SungDuck Chun, Seoul (KR); Seungjune Yi, Seoul (KR); Young Dae Lee, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 12/697,482

(22) Filed: Feb. 1, 2010

(65) Prior Publication Data

US 2010/0197310 A1    Aug. 5, 2010

Related U.S. Application Data

(60) Provisional application No. 61/149,007, filed on Feb. 1, 2009, provisional application No. 61/149,709, filed on Feb. 4, 2009.

(30) Foreign Application Priority Data

Jan. 29, 2010   (KR) .................. 10-2010-0008470

(51) Int. Cl.
*H04W 4/00* (2009.01)

(52) U.S. Cl. .................. 455/434; 455/435.3; 455/435.1; 455/435.2; 455/455; 455/466

(58) Field of Classification Search .................. 455/434, 455/435.3, 435.1, 435.2, 450, 558
See application file for complete search history.

(56) References Cited

U.S. PATENT DOCUMENTS

| | | | |
|---|---|---|---|
| 7,327,729 B2* | 2/2008 | Kawaguchi et al. | 370/389 |
| 8,170,548 B2* | 5/2012 | Iwamura et al. | 455/432.1 |
| 2004/0162074 A1* | 8/2004 | Chen | 455/437 |
| 2009/0181676 A1* | 7/2009 | Lee et al. | 455/436 |
| 2009/0239533 A1* | 9/2009 | Somasundaram et al. | 455/434 |
| 2009/0305699 A1* | 12/2009 | Deshpande et al. | 455/434 |
| 2010/0291927 A1* | 11/2010 | Wu et al. | 455/435.3 |
| 2010/0292927 A1* | 11/2010 | Jacobson et al. | 702/8 |

* cited by examiner

*Primary Examiner* — Ajit Patel
*Assistant Examiner* — Khai M Nguyen
(74) *Attorney, Agent, or Firm* — Lee, Hong, Degerman, Kang & Waimey

(57) ABSTRACT

A method and apparatus for performing cell selection is provided. The apparatus includes a memory configured to store basic priorities of a plurality of frequencies, and a processor configured to measure the signal strength of at least one cell in at least one of the plurality of frequencies, and perform cell selection based on an overrided priority if a cell with a highest measured signal strength is a closed subscriber group (CSG) cell and the highest measured signal strength is greater than a CSG threshold. When the quality of a serving CSG cell deteriorates, another cell from a different frequency may be selected.

12 Claims, 15 Drawing Sheets

METHOD AND APPARATUS FOR PERFORMING CELL SELECTION IN WIRELESS COMMUNICATION SYSTEM

CROSS-REFERENCE TO RELATED APPLICATIONS

This application claims the benefit of priority of U.S. Provisional applications 61/149,007 filed on Feb. 1, 2009, U.S. Provisional applications 61/149,709 filed on Feb. 4, 2009, and Korean Patent Application No. 10-2010-0008470, filed on Jan. 29, 2010, all of which are incorporated by reference in their entirety herein.

BACKGROUND OF THE INVENTION

1. Field of the Invention

The present invention relates to wireless communications, and more particularly, to a method and apparatus for performing cell selection in a wireless communication system.

2. Related Art

The Third Generation Partnership Project (3GPP) Long Term Evolution (3GPP LTE) which is a set of enhancements to the Universal Mobile Telecommunications System (UMTS) is introduced as 3GPP Release 8. The 3GPP LTE uses orthogonal frequency division multiple access (OFDMA) for the downlink, and single carrier frequency division multiple access (SC-FDMA) for the uplink, and adopts multiple input multiple output (MIMO) with up to 4 antennas. Research is now underway on 3GPP LTE-Advanced (LTE-A), which is a major enhancement to 3GPP LTE.

Cell selection and cell reselection are processes of selecting a serving cell for serving a user equipment (UE). The UE measures the serving cell and/or its neighboring cells, and selects a best ranked cell.

Closed subscriber group (CSG) services, which are services that can be provided only to a certain group of subscribers, have been introduced to improve quality of service. A base station (BS) capable of providing CSG services is referred to as a Home eNodeB (HNB), and a cell serving CSG members is referred to as a CSG cell. The basic requirements regarding CSG services are as disclosed in 3GPP TS 22.220 V1.0.1 (2008-12) "Service requirements for Home NodeBs and Home eNodeBs (Release 9)".

In CSG cells where CSG services are currently provided, channel environment may deteriorate. Thus, the quality of services may sometimes be worse in CSG cells than in non-CSG cells.

In, systems for supporting CSG services, there is a need for a method and apparatus to take a channel environment into consideration when performing cell selection.

SUMMARY OF THE INVENTION

The present invention provides a method and apparatus for performing cell selection in a wireless communication system, in which a plurality of frequency priority schemes are used.

The present invention also provides a method and apparatus for performing cell selection in a wireless communication system supporting closed subscriber groups (CSGs).

In an aspect, a wireless apparatus for performing cell selection in a wireless communication system is provided. The apparatus includes a radio frequency (RF) unit to transmit and receive radio signals, a memory configured to store basic priorities of a plurality of frequencies, and a processor connected to the RF unit and the memory and to implement a radio interface protocol, wherein the processor is configured to measure the signal strength of at least one cell in at least one of the plurality of frequencies, and perform cell selection based on an overrided priority if a cell with a highest measured signal strength is a closed subscriber group (CSG) cell and the highest measured signal strength is greater than a CSG threshold.

If the cell with the highest measured signal strength is a CSG cell and the highest measured signal strength is less than the CSG threshold, the processor may be configured to perform cell selection based on the basic priorities.

The overrided priority may give the highest priority to the frequency of the CSG cell to override the basic priorities.

The at least one cell may include a serving cell and a neighboring cell.

The serving cell may be a CSG cell.

The basic priorities may be received from a base station (BS).

In another aspect, a method of performing cell selection in a wireless communication system is provided. The method includes configuring, at a user equipment (UE), basic priorities of a plurality of frequencies, measuring a signal strength of at least one cell in at least one of the frequencies, and performing cell selection based on an overrided priority if a cell with a highest measured signal strength is a closed subscriber group (CSG) cell and the highest measured signal strength is greater than a CSG threshold.

When the quality of a serving CSG cell of a UE deteriorates, the UE may select a cell from a different frequency from that of the serving CSG cell as a new serving cell and may thus be able to be provided with better-quality services. In addition, since the UE can select the CSG cell only when the CSG cell is expected to provide good services, it is possible to guarantee Quality of Service (QoS).

DESCRIPTION OF EXEMPLARY EMBODIMENTS

Figure 1:
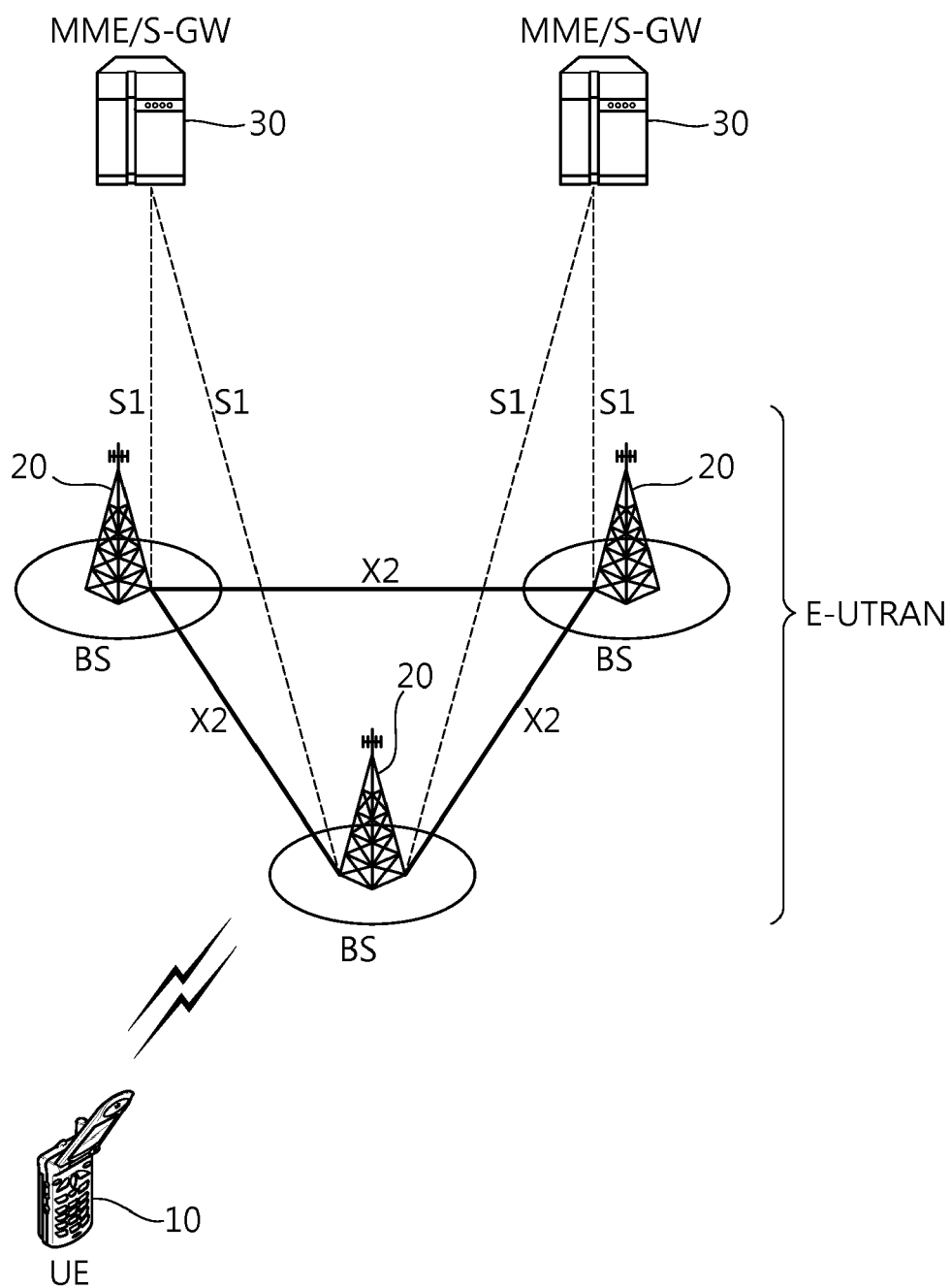
FIG. 1 is a view illustrating a mobile communication system to which the present invention are applied.

FIG. 1 is a view illustrating a mobile communication system to which the present invention are applied. This system may be also referred to as an Evolved-UMTS Terrestrial Radio Access Network (E-UTRAN) or a Long Term Evolution (LTE)/LTE-advanced (LTE-A) system.

The E-UTRAN includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like.

The BSs 20 are interconnected with each other by means of an X2 interface. The BSs 20 are also connected by means of the S1 interface to the EPC (Evolved Packet Core) 30, more specifically to the Mobility Management Entity (MME) by means of the S1-MME and to the Serving Gateway (S-GW) by means of the S1-U.

The EPC 30 may include the MME, the S-GW, and a Packet Data Network-Gateway (P-GW). The MME has information on the connection of UE or the capability of UE, and such information is primarily used for the mobility management of the UE. The S-GW is a gateway having E-UTRAN as an end point, and the P-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (RRC) layer located at the third layer plays a role of controlling radio resources between UE and a network. For the purpose of this, the RRC layer exchanges RRC messages between UE and a network.

Figure 2:
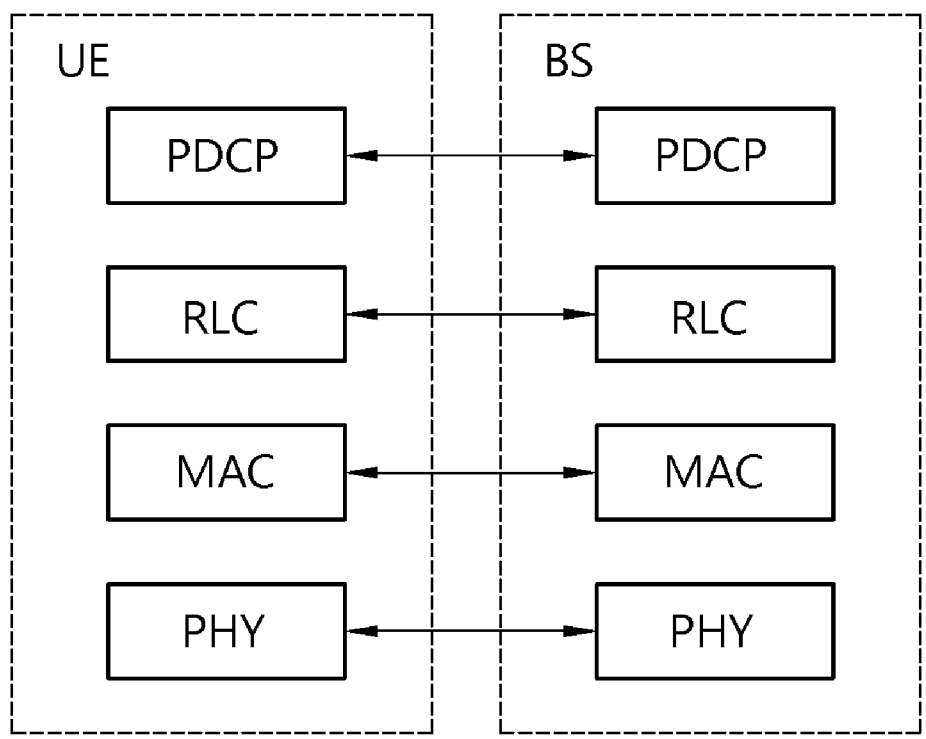
FIG. 2 is a block diagram showing radio protocol architecture for a user plane.
Figure 3:
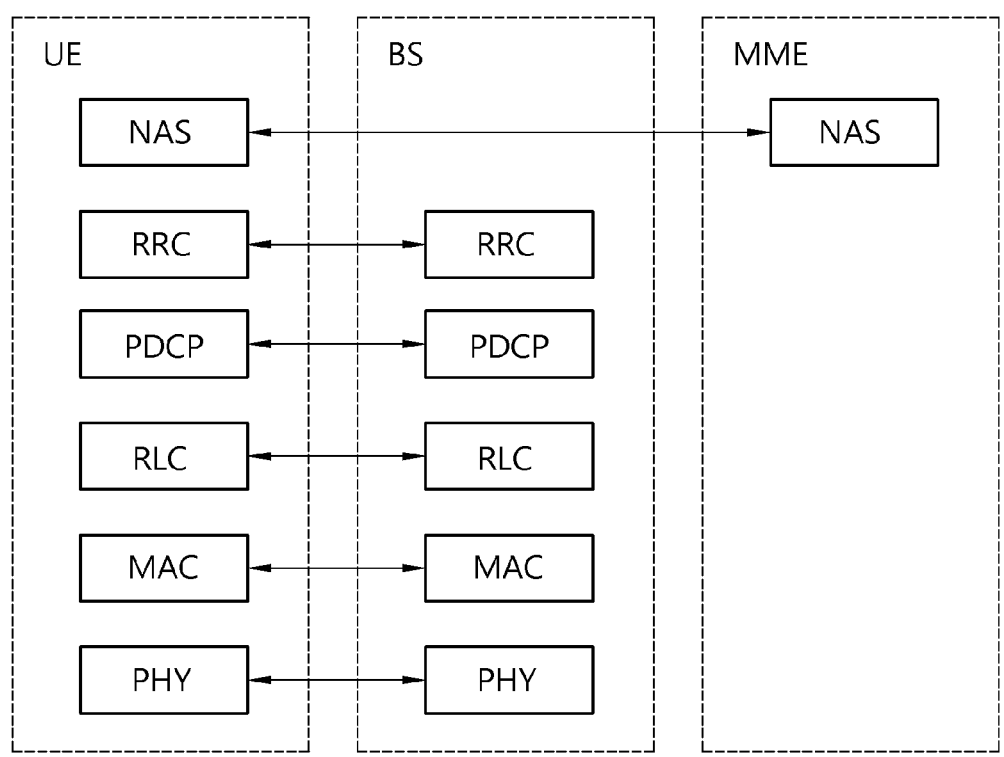
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for user data transmission and the control plane is a protocol stack for control signal transmission.

Referring to FIGS. 2 and 3, a physical (PHY) layer provides information transfer services to upper layers on a physical channel. The PHY layer is coupled with a MAC (Medium Access Control) layer, i.e., an upper layer of the PHY layer, through transport channels. Data is transferred between the MAC layer and the PHY layer through the transport channel. The transport channels are classified by how and with what characteristics data are transferred over the radio interface.

Between different physical layers, i.e., the physical layer of a transmitter and the physical layer of a receiver, data are transferred through the physical channel. The physical channel may be modulated by an Orthogonal Frequency Division Multiplexing (OFDM) scheme, and time and frequency are used as radio resources for the physical channel.

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ).

The functions of a Packet Data Convergence Protocol (PDCP) layer for the user plane include transfer of user data, header compression/decompression and ciphering/deciphering. The functions of the PDCP layer for the control plane include transfer of control plane data, and ciphering and integrity protection.

A Radio Resource Control (RRC) layer is defined only in the control plane. The RRC layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

If an RRC connection is established between a RRC layer of the UE and a RRC layer of the E-UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple symbols inn time domain and multiple sub-carriers in frequency domain. A sub-frame includes a plurality of symbols in the time domain. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A Transmission Time Interval (TTI) as a unit time for transmitting data is 1 ms, corresponding to one sub-frame.

Hereinafter, an RRC state and an RRC connection method of UE will be described in detail.

The RRC state refers to whether or not the RRC layer of the UE is logically connected to the RRC layer of the E-UTRAN. If connected, then it is called an RRC_CONNECTED state, and otherwise it is called an RRC_IDLE state. For the UE in an RRC_CONNECTED state, the E-UTRAN can recognize the existence of the relevant UE in a cell unit because there exist an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the corresponding cell. The UE camped in an RRC_IDLE state makes an RRC connection with the E-UTRAN through an RRC connection procedure when it is required to make an RRC connection, thereby changing the state to an RRC_CONNECTED state. There are several cases when the UE in the RRC_IDLE state is required to make an RRC connection. For example, an uplink data transmission may be required due to a phone call attempt by the user, or the like, or the transmission of a response message may be required in response to a paging message received from the E-UTRAN.

A Non-Access Stratum (NAS) layer belonging to the upper layer of the RRC layer serves to perform session management and mobility management.

In order to manage the mobility of the UE at the NAS layer, both an EPS Mobility Management-REGISTERED (EMM-REGISTERED) state and an EMM-DEREGISTERED state are defined, and both states will be applied to the UE and the MME. The UE is initially in an EMM-DEREGISTERED state, and carries out a process of registering it into the corresponding network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or cell reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the corresponding location of the UE.

Next, system information will be described.

The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

In the Section 5.2.2 of the 3GPP TS 36.331 V8.4.0 (2008-12) "Radio Resource Control (RRC); Protocol specification (Release 8)", the system information can be divided into Master Information Block (MIB), Scheduling Block (SB) and System Information Block (SIB). The MIB allows the UE to be notified of a physical architecture of the corresponding cell, for example, a bandwidth, and the like. The SB notifies of the transmission information of SIBs, for example, transmission period, and the like. The SIB is a set of mutually-related system information. For example, a certain SIB includes only the information of neighboring cells, and another certain SIB includes only the information of uplink radio channels used by the UE.

In general, network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the corresponding UE.

2) Suitable cell: A cell in which the UE can receive a normal service. This cell satisfies the condition of an acceptable cell, and at the same time satisfies additional conditions. For additional conditions, the cell should be attached to PLMN to which the corresponding UE can be accessed, and it should be a cell in which the implementation of a tracking area update procedure by the UE is not barred. If the relevant (or corresponding) cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Figure 4:
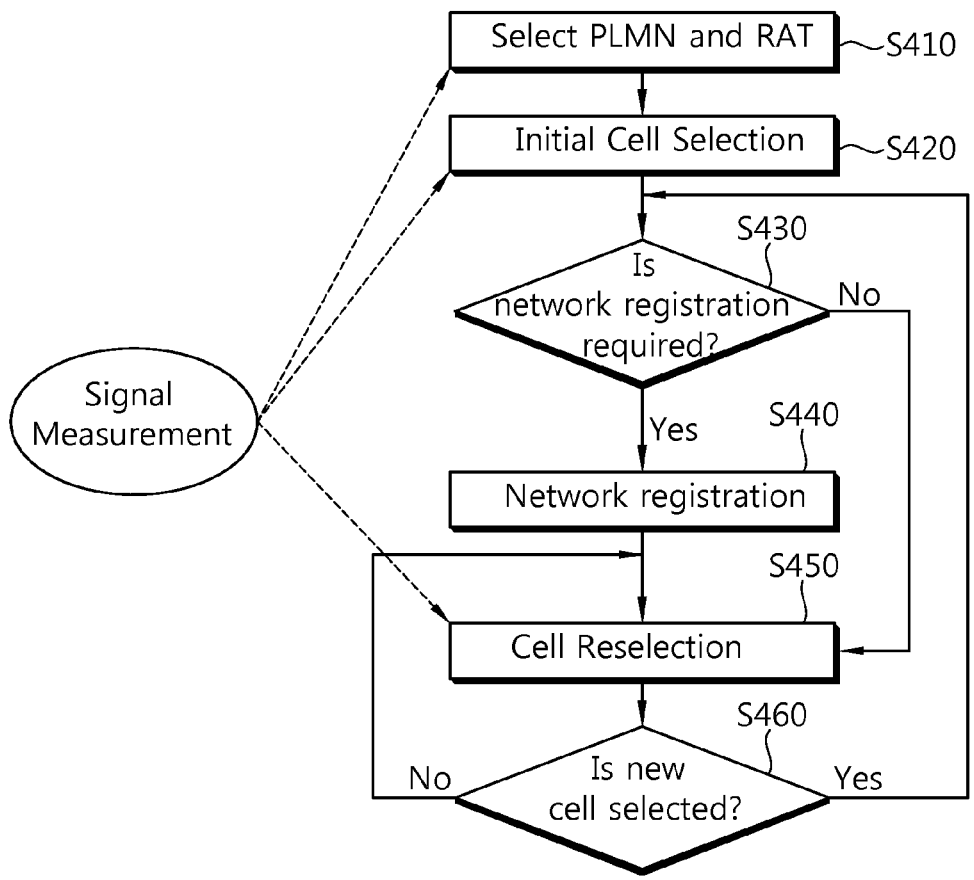
FIG. 4 is an exemplary view illustrating the operation of UE selecting a cell in the idle mode.

FIG. 4 is an exemplary view illustrating the operation of UE selecting a cell in the idle mode.

A UE selects a Radio Access Technology (RAT) for communicating with a Public Land Mobile Network (PLMN) from which the UE itself desires to receive a service (S410). The information of PLMN and RAT may be selected by the user of the UE, and what is stored in the USIM may be also used.

The UE selects a cell having the largest value among the cells that the measured base station has a value greater than a particular value in the signal intensity and quality (S420). Then, it receives system information being sent by the base station. The particular value denotes a value defined by a system to guarantee the quality of physical signals in the data transmission and/or reception. Accordingly, the value may vary based on the RAT to be applied.

If a network registration is required, the UE registers its own information (for example, IMSI) for receiving a service (for example, paging) from a network (S430, S440). The UE is not registered into a network to be accessed whenever selecting a cell. For example, system information (for example, Tracking Area Identity (TAI)) of the network to be registered is different from network information that the UE itself knows.

If a value of the signal intensity and quality measured by the base station from which the UE receives a service is less than a value measured by the base station of the neighboring cell, then the UE selects one of the other cells providing signals having better characteristics than those of the cell of the base station being accessed by the UE (S450). This process is called a cell reselection to distinguish it from an initial cell selection in the step S420. At this time, a time restriction condition may be specified in order to prevent a cell from being frequently reselected based on the change of the signal characteristics.

Next, a procedure for selecting a cell by the UE will be described in detail.

If the UE is turned on or camps on a cell, the UE may perform procedures for selecting/reselecting a cell having a suitable quality in order to receive a service.

The UE in a RRC_IDLE state needs to select a cell having a suitable quality all the time, and thus be prepared to receive a service through the cell. For example, the UE that has been just turned on selects a cell having a suitable quality to be registered into a network. If the UE that has been in a RRC_CONNECTED state enters into an RRC_IDLE state, then the UE should select a cell in which the UE itself is camped on. In this manner, a process of selecting a cell satisfying a predetermined condition by the UE in order to be camped in a service waiting state such as the RRC_IDLE state, is called a cell selection. The cell selection is performed in a state that the UE does not currently determine a cell in which the UE itself is camped in the RRC_IDLE state, and thus it is very important to select the cell as quickly as possible. Therefore, if it is a cell providing a radio signal quality greater than a predetermined level, then it may be selected during a cell selection process by the UE even though the cell is not a cell providing best radio signal quality.

Hereinafter, by referring to the disclosure 3GPP TS 36.304 V8.3.0 (2008-09) "User Equipment (UE) procedures in idle mode (Release 8)", a method and procedure for selecting a cell by a UE will be described in detail.

If power is initially turned on, the UE searches for available PLMNs and selects a suitable PLMN to receive a service. Subsequently, the UE selects a cell having a signal quality and characteristic capable of receiving a suitable service among the cells being provided by the selected PLMN.

The cell selection process can be classified into two types.

One type is an initial cell selection process, and in this process, the UE does not have previous information on radio channels. Therefore, the UE searches for all the radio channels to find a suitable cell. In each channel, the UE searches for the strongest cell. Subsequently, if a suitable cell satisfying the cell selection criteria is found, then the UE selects the corresponding cell.

The other type is a cell selection process using the stored information, and in this process, the UE uses information on radio channel stored in the UE, or selects a cell by using information being broadcasted from the cell. Accordingly, a cell may be quickly selected compared to an initial cell selection process. If a cell satisfying the cell selection criteria is found, then the UE selects the corresponding cell. If a cell satisfying the cell selection criteria is not found, then the UE performs an initial cell selection process.

The cell selection criteria used by the UE in the cell selection process may be represented by as shown:

$$Srxlev > 0 \quad \text{[Equation 1]}$$

where Srxlev=Qrxlevmeas−(Qrxlevmin+Qrxlevminoffset)−Pcompensation, Qrxlevmeas denotes a measured cell received level (RSRP), Qrxlevmin denotes a minimum required received level in the cell (dBm), Qrxlevminoffset denotes a offset to Qrxlevmin, Pcompensation=max(PEMAX−PUMAX, 0) (dB), PEMAX denotes a maximum transmission power allowed for the UE in the corresponding cell (dBm), and PUMAX denotes a maximum transmission power of the UE radio transmission unit based on the performance of the UE (dBm).

In the above Equation 1, it may be seen that UE selects a cell having a value of the measured signal intensity and quality greater than a particular value specified by the cell providing a service. Furthermore, the parameters used in the above Equation 1 are broadcast via the system information, and the UE receives those parameter values to use them for the cell selection criteria.

If the UE selects a cell satisfying the cell selection criteria, then the UE receives the information required for the RRC_IDLE mode operation of the UE in the corresponding cell from the system information of the corresponding cell. The UE receives all the information required for the RRC_IDLE mode operation, and then waits in an idle mode to request a service (for example, originating call) to a network or receive a service (for example, terminating call) from a network.

After the UE selects a certain cell via a cell selection process, the signal intensity and quality between the UE and the base station may be changed due to the change of the UE mobility and wireless environment. Therefore, if the quality of the selected cell is deteriorated, then the UE may select another cell providing better quality. In this manner, if a cell is reselected, then a cell providing signal quality better than that of a currently selected cell is typically selected. This process is called a cell reselection. A basic object of the cell reselection process is typically to select a cell providing best quality to the UE from a standpoint of the radio signal quality.

In addition to the standpoint of the radio signal quality, the network may notify the UE of its priority by determining it for each frequency. The UE that has received the priority may consider this priority in the first place than the radio signal quality criteria during the cell reselection process.

As described above, there is a method of selecting or reselecting a cell based on the signal characteristics of wireless environment. When reselecting a cell, in selecting a cell for the reselection, there may be cell reselection methods as described below, based on the RAT and frequency characteristics of a cell.

Intra-frequency cell reselection: A cell having a center-frequency similar to the RAT of the cell currently being used by the UE is reselected.

Inter-frequency cell reselection: A cell having a center-frequency different from the RAT of the cell currently being used by the UE is reselected.

Inter-REAT cell reselection: A cell using a different RAT from the RAT currently being used by the UE is reselected.

The principles of cell reselection are as follows.

First, a UE may measure the quality of a serving cell and/or the quality of a neighboring cell for cell reselection.

Second, the cell reselection may be performed based one cell reselection criteria. The cell reselection criteria has following characteristics with regard to the measurement of cells.

Intra-frequency cell reselection may be performed based on the rankings of cells. The rankings may is a procedure to define a ranking criterion and to order the cells based on the ranking criterion. A highest-ranking cell is referred to as a best-ranked cell. A ranking value may be a measured result provided by a UE or may be the adjusted value of applying a frequency offset or cell offset to the measured result.

Inter-frequency cell reselection may be performed based on the priorities of frequencies which are provided by a BS. A UE may attempt to camp on a cell at a frequency with a highest priority. A network may provide frequency priorities to UEs via broadcast signaling or via dedicated signaling.

For inter-frequency cell reselection, a network may provide parameters (e.g., frequency-specific offsets) for use in cell reselection to each UE.

For intra- or inter-frequency cell reselection, a network may provide a neighboring cell list (NCL) for use in cell reselection to each UE. The NCL may include cell-specific parameters (e.g. cell-specific offsets).

For intra- or inter-frequency cell reselection, a network may provide a blacklist including a number of cells that should not be reselected to each UE. The cells included in the blacklist may not be subjected to cell reselection.

The rankings of cells will hereinafter be described in further detail.

A ranking criterion for ranking cells may be defined by as shown:

$$Rs = Qmeas,s + Qhyst, Rn = Qmeas,n - Qoffset \quad \text{[Equation 2]}$$

where Rs indicates a ranking value of a serving cell, Rn indicates a ranking value of a neighboring cell, Qmeas,s indicates the quality of the serving cell measured by a UE, Qmeas,n indicates the quality of the neighboring cell measured by the UE, Qhyst indicates a hysteresis value for ranking, and Qoffset indicates an offset between two cells1.

In intra-frequency cell reselection, if a UE receives an offset Qoffsets,n between the serving cell and the neighboring cell, Qffoset=Qoffsets,n. Otherwise, Qffoset=0.

In inter-frequency cell reselection, if the UE receives the offset Qoffsets,n, Qoffset=Qoffsets,n+Qfrequency. Otherwise, Qoffset=Qfrequency.

If the ranking values of the serving cell and the neighboring cell are not much different from each other and constantly vary, the rankings of the serving cell and the neighboring cell may change frequently. Thus, the serving cell and the neighboring cell may be alternately selected as a new serving cell to often. In order to address this problem, the hysteresis value Qhyst may be used.

A UE may determine the rankings of the serving cell and the neighboring cell using Equation (2), may determine whichever of the serving cell and the neighboring cell has a higher ranking value than the other cell as a best-ranked cell, and may select the best-ranked cell as a new serving cell.

In the above-mentioned cell reselection criterion, the quality of cells is considered as most important factor when performing cell reselection. If a reselected cell is not a suitable cell, a UE may exclude the reselected cell or the frequency of the reselected cell.

Hereinafter, Closed Subscriber Group (CSG) will be described.

A base station which provides CSG service is called a Home Node B (HNB) or Home eNB (HeNB) in 3GPP. Hereinafter, both the HNB and HeNB are commonly designated as a HNB. An object of the HNB is basically to provide specialized services only to a member of the CSG However, those services may be provided to other users in addition to the CSG based on the operation mode setting of the HNB.

Figure 5:
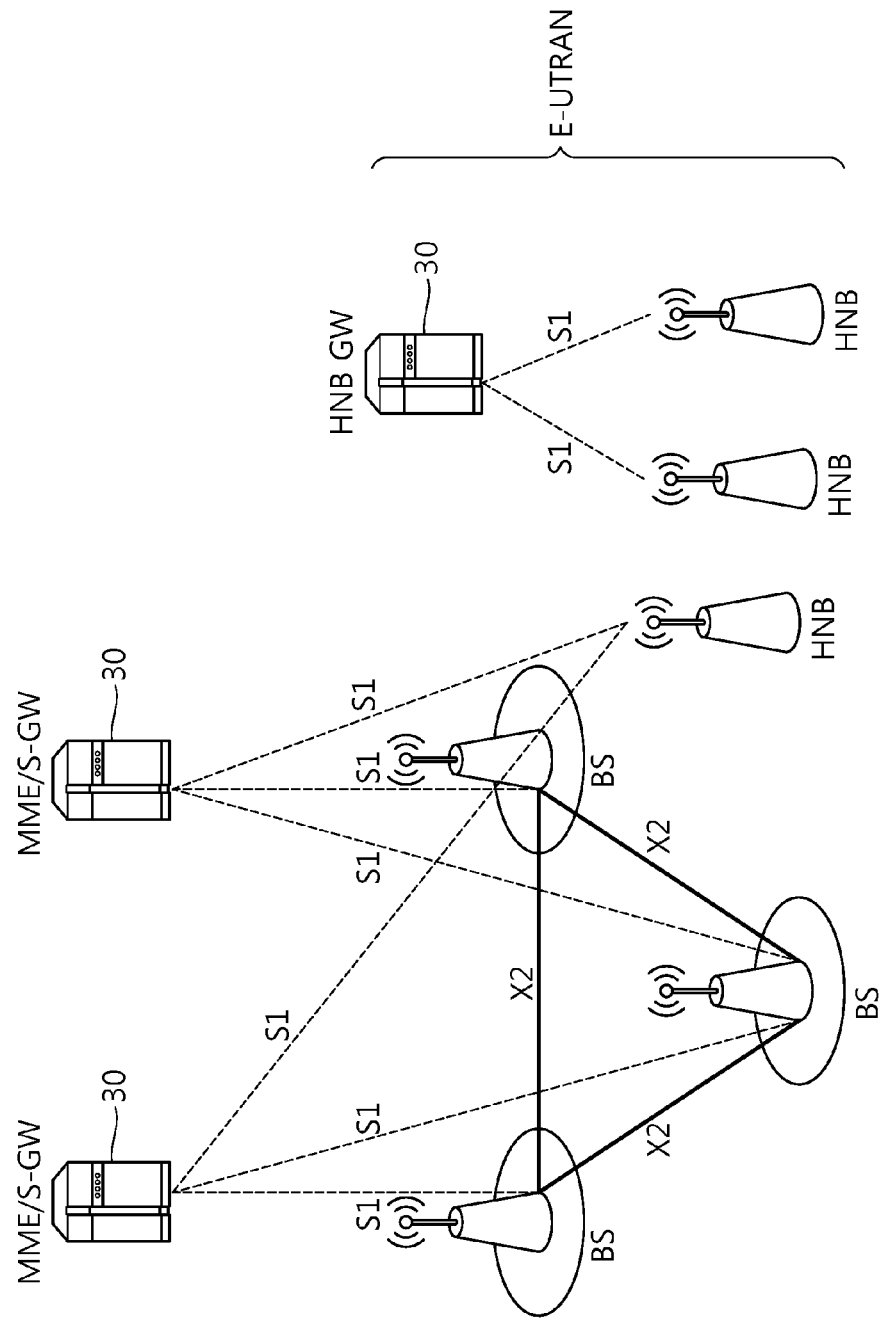
FIG. 5 is an exemplary view illustrating a network architecture for managing an HNB by using an HNB gateway (GW).

FIG. 5 is an exemplary view illustrating a network architecture for managing an HNB by using an HNB gateway (GW).

HNBs may be connected to EPC via HNB GW or directly connected to EPC. Here, the HNB GW is regarded as a typical BS to MME. Also, the HNB GW is regarded as the MME to the HNB. Therefore, an S1 interface is connected between HNB and HNB GW, and also an S1 interface is connected between the HNB GW and the EPC. Furthermore, even in case of directly connecting between HNB and EPC, it is connected via an S1 interface. The function of HNB is almost similar to the function of a typical BS.

In general, HNB has a low radio transmission output power compared to the BS owned by mobile communication service providers. Therefore, the service coverage provided by HNB is typically smaller than the service coverage provided by (e)NB. Due to such characteristics, the cell provided by HNB is classified as a femto cell in contrast to a macro cell provided by (e)NB from a standpoint of the service coverage.

From a standpoint of provided services, when HNB provides those services only to a CSG group, the cell provided by this HNB is referred to as a CSG cell.

Each CSG has its own identifier which is called a CSG ID (CSG identity). The UE may have a CSG list to which the UE itself belongs as a member thereof, and this CSG list may be changed by a request of the UE or a command of the network. In the current specification of the 3GPP, one HNB may support one CSG.

A UE has a list of CSGs to which the UE belongs as a member. This list is called as a CSG white list.

HNB delivers the CSG ID of the CSG being supported by itself through the system information, thereby allowing only the corresponding CSG member UE to be accessed. When a CSG cell is found by the UE, what type of CSG being supported by this CSG cell can be checked by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG white list.

It is not always required for HNB to allow the CSG UE to be accessed. Based on the configuration setting of HNB, non-CSG member UE may be allowed to be accessed. The type of UE allowed to be accessed may be changed based on the configuration setting of HNB. Here, the configuration setting denotes the setting of the access mode (or may be called as operation mode) of HNB. The access mode of HNB can be divided into three types as follows based on the type of UE.

1) Closed access mode: A mode in which services are provided to particular CSG members only. A CSG cell is provided by the HNB.

2) Open access mode: A mode in which services are provided without any restriction of particular CSG members like typical (e)NB. The HNB provides a typical cell not a CSG cell. For clarity, a macro cell is a cell operated by the open access mode.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

HNB notifies the UE that the cell being serviced by itself is a CSG cell or typical cell, allowing the UE to know whether or not it can be accessed to the corresponding cell. HNB being managed in a closed access mode broadcasts via the system information that it is a CSG cell. In this manner, HNB allows the system information to include a CSG indicator indicating whether or not the cell being serviced by itself is a CSG cell in the system information.

For example, the CSG cell broadcasts by setting the CSG indicator to 'TRUE'. If the cell being serviced is not a CSG cell, then it may be used a method that the CSG indicator may be set to 'FALSE' or the transmission of the CSG indicator is omitted. The UE should distinguish a typical cell from a CSG cell, and thus a typical BS may also transmit the CSG indicator (for example, the CSG indicator set to 'FALSE'), thereby allowing the UE to know that the cell type provided by itself is a typical cell. Furthermore, the typical BS may not transmit the CSG indicator, thereby allowing the UE to know that the cell type provided by itself is a typical cell, too.

The CSG-related parameters transmitted by the corresponding cell for each cell type are represented in Table 1. The CSG-related parameters may be transmitted via system information.

TABLE 1

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

The types of UE allowed to be accessed for each cell type are represented in Table 2.

TABLE 2

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Figure 6:
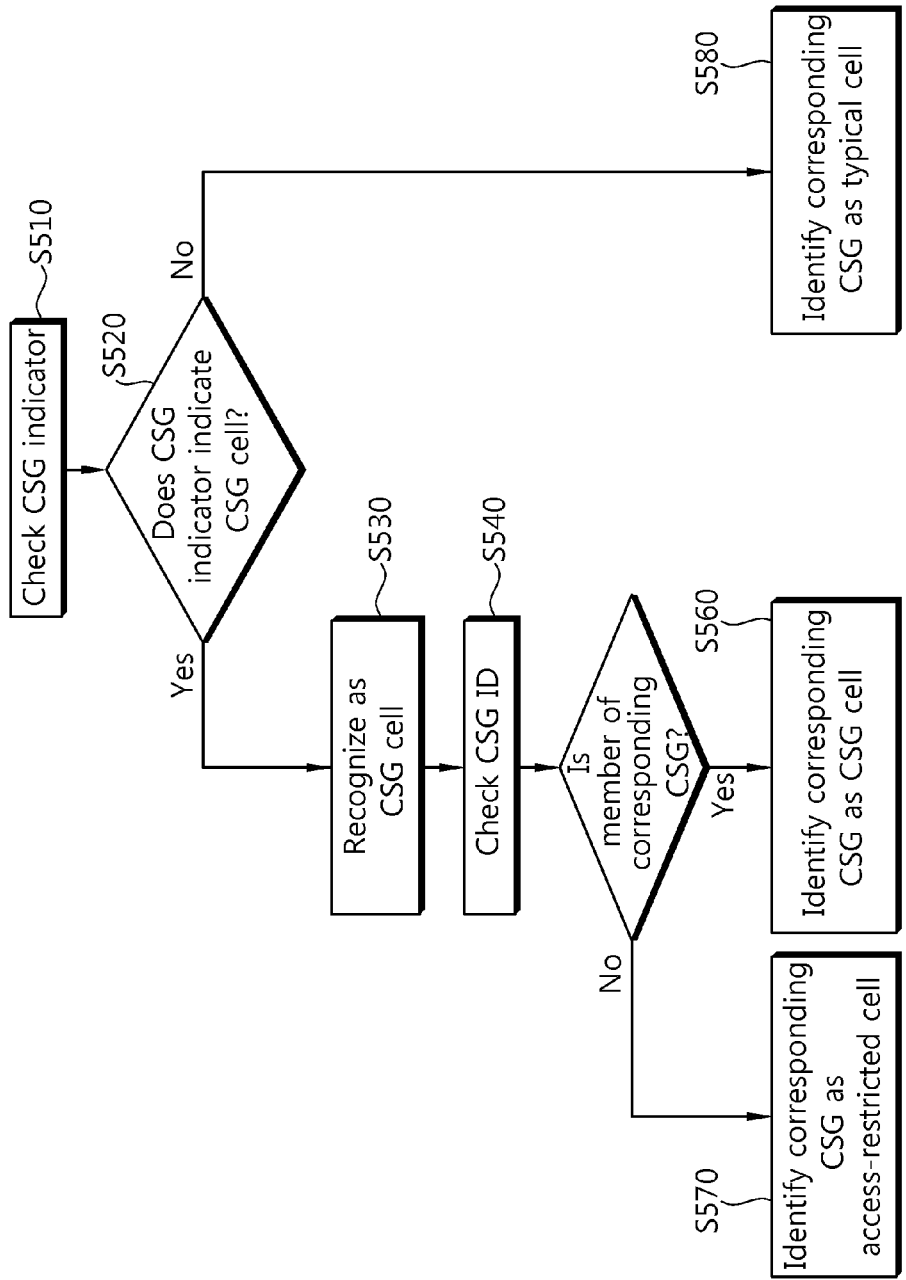
FIG. 6 is a flowchart illustrating a method of checking the access mode of a base station by the UE.

FIG. 6 is a flowchart illustrating a method of checking the access mode of a base station by the UE.

A UE checks a CSG indicator in system information of a target cell in order to confirm what is the type of the target cell (S510).

After checking the CSG indicator, if the CSG indicator indicates that the target cell is a CSG cell, then the UE recognizes the corresponding cell as the CSG cell (S520, S530). The UE checks the CSG ID in the system information in order to check whether or not the UE itself is a CSG member of the target cell (S540).

If it is checked from the CSG ID that the UE is a CSG member of the target cell, then the corresponding cell will be recognized as an accessible CSG cell (S550, S560). If it is checked from the CSG ID that the UE is not a CSG member of the target cell, then the corresponding cell will be recognized as an inaccessible CSG cell (S550, S570).

If the CSG indicator indicates that the target cell is not a CSG cell, then the UE recognizes the target cell as a typical cell (S520, S580). Furthermore, if the CSG indicator is not transmitted in the step S510, the UE recognizes the object cell as a typical cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve a physical layer cell identifier for the CSG cell in a mixed carrier frequency. The physical layer cell identifier is called a Physical Cell Identity (PCI) in E-UTRAN, and called a Physical Scrambling Code (PSC) in UTRAN. For clarity, the physical layer cell identifier will be expressed by PCI.

The CSG cell notifies information on the PCI reserved for CSG cell at a current frequency via the system information. The UE that received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency it may be known that the corresponding cell is a CSG cell if only a cell having the PCI reserved for CSG is found, instead of individually checking the CSG identity of the system information of every cell found in the whole PCI range.

It will hereinafter be described how to perform cell reselection related to a CSG cell.

A CSG cell is a cell for providing better-quality services, i.e., CSG services, to its member UEs. Since UE may be typically serviced with better Quality of Service (QoS) in a CSG cell than in non-CSG cell, when a UE camps on the CSG cell, the selection of another cell may not be appropriate in terms of QoS even if an inter-frequency of a higher priority than a serving frequency is found.

In order to prevent a cell at an inter-frequency of a higher priority than a serving frequency from being selected over a serving CSG cell during reselection process, a UE may assume the serving frequency to have the highest priority of all other frequencies as long as the serving CSG cell is evaluated as the best-ranked cell on the corresponding frequency.

In order to encourage a UE to reselect a CSG cell at inter-frequency other than non-CSG cell at intra/inter-frequency regardless of a frequency priority of the CSG cell, the UE may assume that the frequency of the CSG cell to have the highest priority of all other frequencies as long as the CSG cell is evaluated as the best ranked cell on the corresponding frequency.

When the UE gives the highest priority to a specific frequency without any explicit network signaling, this frequency priority may be called as 'implicit highest priority'. In this manner, it is possible to help the UE camp on the CSG cell as much as possible without violating the existing cell reselection rule that cell reselection is performed based on the priorities of frequencies.

Figure 7:
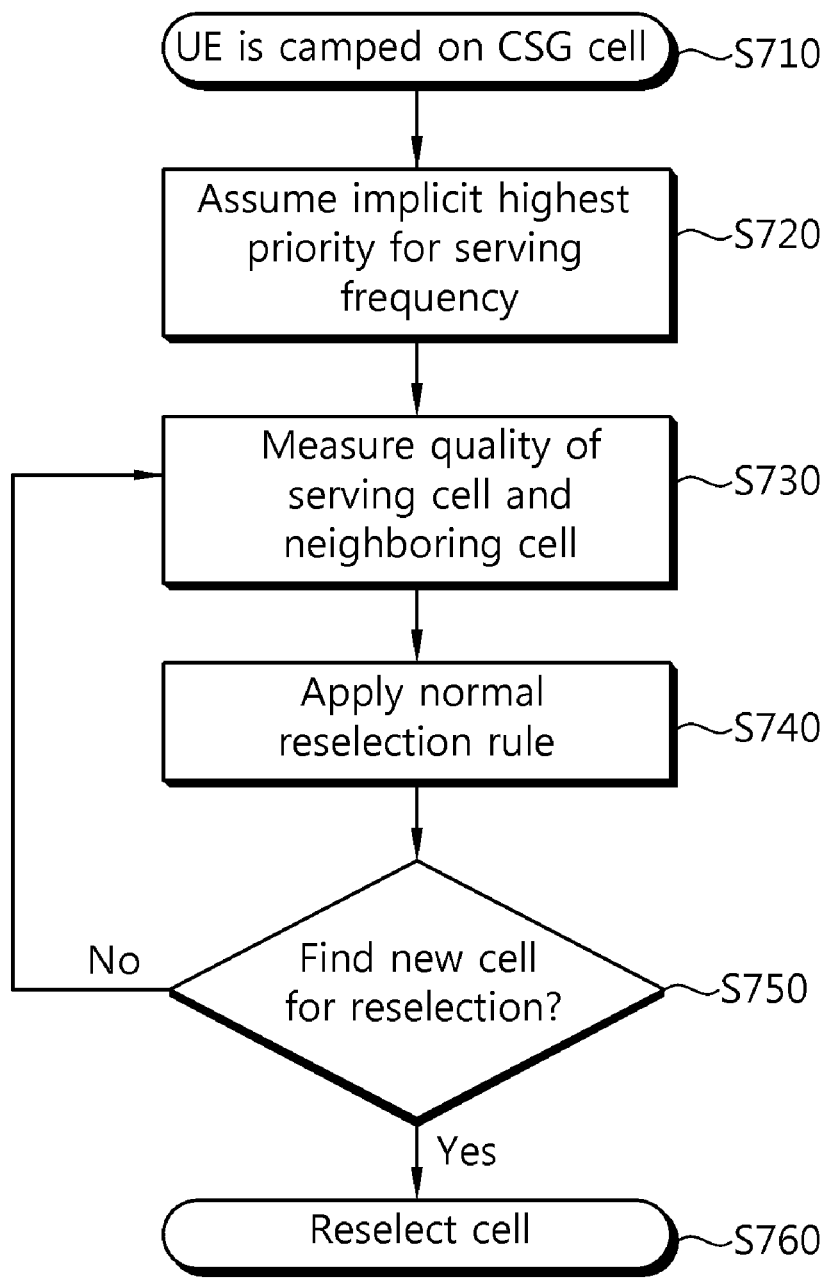
FIG. 7 illustrates a conventional cell reselection method.

FIG. 7 illustrates a conventional cell reselection method.

A UE camps on a CSG cell (S710).

Since a serving cell of the UE is the CSG cell, an implicit highest priority may be assigned to a serving frequency (S720).

The UE may measure the quality of the serving CSG cell and a neighboring cell (S730).

The UE may apply a normal reselection rule based on the measurement results performed in step S730 (S740). More specifically, the UE may search a best ranked cell in a frequency of a higher priority than the serving frequency. If no best-ranked cell is found from the frequency of a higher priority than the serving frequency, the UE may search the best ranked cell in a frequency having the same priority as that of the serving frequency. If no best-ranked cell is found from the frequency having the same priority as that of the serving frequency, the UE may search the best ranked cell in a frequency of a lower priority than the serving frequency.

If a new cell is found (S750), the UE may reselect the new cell (S760).

If the reselected cell is a non-CSG cell, the UE may withdraw the implicit highest priority assigned to the serving CSG cell, and may use frequency priorities provided by a network for cell reselection.

If the UE finds a new best-ranked CSG cell from a frequency having the same priority as that of the serving frequency, the UE may decide whether to stay in the current serving CSG cell or reselect the new best-ranked CSG cell.

According to the conventional cell reselection method shown in FIG. 7, if a serving cell of a UE is a CSG cell, a UE may assume that a serving frequency has a highest priority as long as the serving CSG cell is evaluated as a best-ranked cell. Therefore, it is possible for the UE to be continuously provided with CSG services while camping on the serving CSG cell.

However, the best-ranked serving CSG cell may not necessarily mean the best-quality cell. That is, even the quality of a serving frequency may deteriorate due to, for example, signal interference. There is a possibility that there may exist better-quality cells on other non-serving frequencies.

Figure 8:
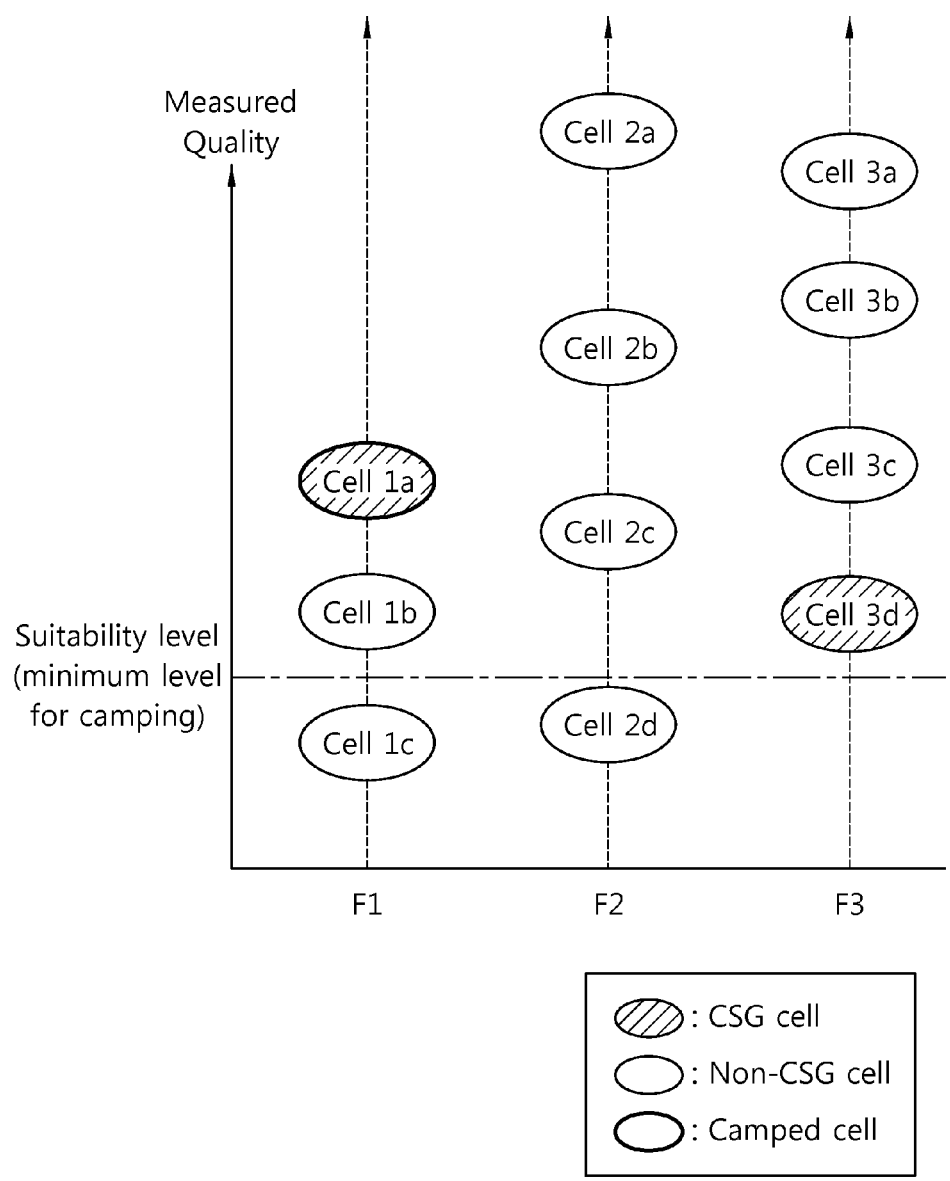
FIG. 8 illustrates the problems of the conventional cell reselection method shown in FIG. 7.

FIG. 8 illustrates the problems of the conventional cell reselection method shown in FIG. 7.

There are three cells 1a through 1c on a first frequency F1, four cells 2a through 2d on a second frequency F2, and four cells 3a through 3d on a third frequency F3. Assume that the cell 1a is a CSG cell, and that a UE camps on the cell 1a.

Since the cell 1a is the best-ranked cell on a serving frequency, i.e., the first frequency F1, the UE may exclude the other cells at other frequencies from consideration as candidates for cell reselection according to the assumption that the serving frequency has the implicit highest priority frequency. Accordingly, the UE may decide to stay in the cell 1a. As a result, quality of service may become worse than when selecting a cell other than the cell 1a as a new serving cell.

According to the conventional cell reselection method, the highest priority may be assigned without exception to a frequency whose best-ranked cell is a CSG cell, thereby deteriorating quality of service especially when the quality of the serving frequency deteriorates.

Figure 9:
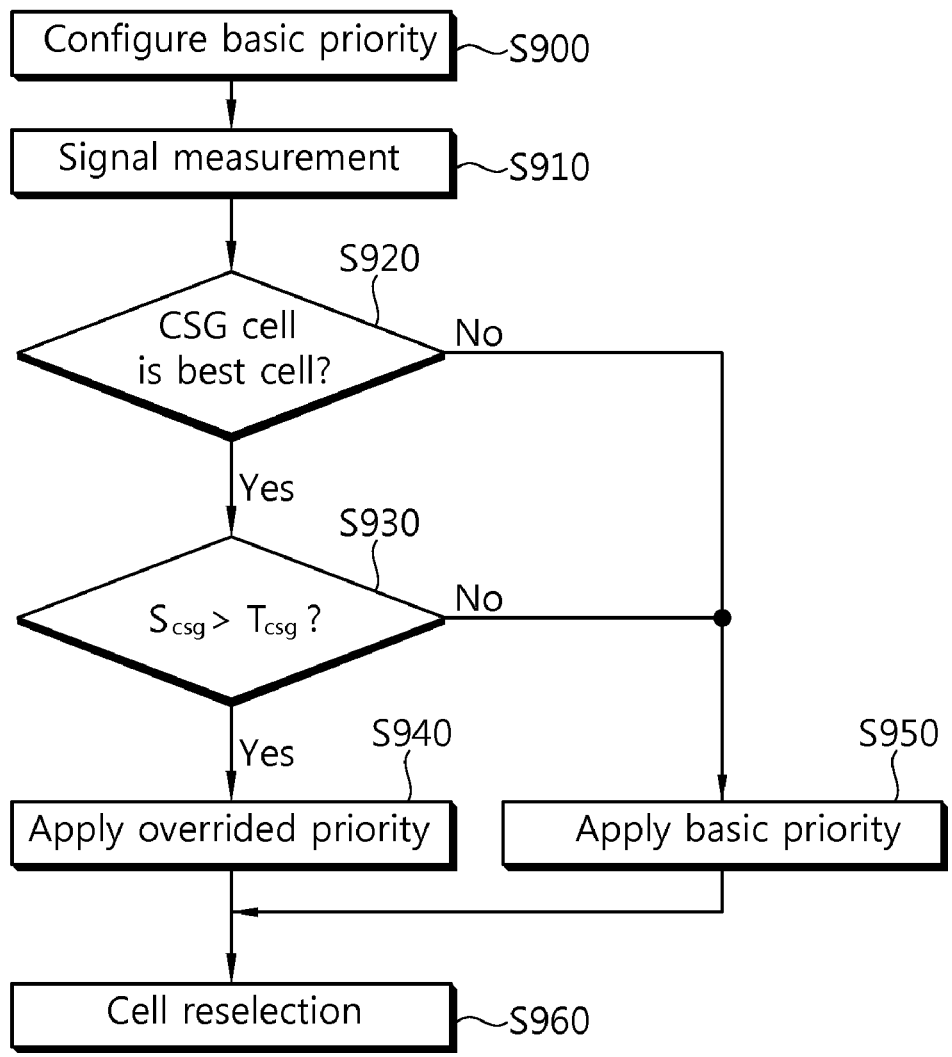
FIG. 9 illustrates a flowchart of a cell reselection method according to an exemplary embodiment of the present invention.

FIG. 9 illustrates a flowchart of a cell reselection method according to an exemplary embodiment of the present invention.

A UE may configure the basic priorities of a plurality of frequencies used for cell reselection based on information provided by a BS (S900). The basic priorities are given for each of the plurality of frequencies for cell selection and may also be referred to as signaled frequency priorities.

The UE may measure the signal strength of a serving cell and a neighboring cell (S910). The serving cell may be a CSG cell or a typical non-CSG cell. The measurement results may include a Reference Signal Received Power (RSRP), a Reference signal Received Quality (RSPQ). The measurement results may includes values that can represent radio channel characteristics relevant to the RAT used by the UE.

If a cell with a highest measured signal strength from at least one of the plurality of frequencies is a CSG cell (S920), the measured result Scsg of the found cell may be compared with a CSG threshold Tcsg (S930).

If a cell with a highest measured signal strength from at least one of the plurality of frequencies is not a CSG cell (S920), a basic priorities may be applied (S950).

If the measured quality Scsg is greater than the CSG threshold Tcsg, an overrided priority may be applied (S940). The overrided priority is the implicit highest priority for the frequency of a CSG cell to override the basic priorities. If a CSG cell is the best ranked cell and its measured result is greater than the CSG threshold Tcsg, cell selection to the CSG cell may be performed (S960).

If the measured quality Scsg is less than the CSG threshold Tcsg, the basic priorities may be applied (S950) and cell selection may be performed (S960).

The CSG threshold Tcsg is a value for determining whether to use the overrided priority or the basic priority in cell reselection. The overrided priority smay be used in cell reselection only when a best-ranked cell found from a certain frequency is a CSG cell and a measured quality of the CSG cell exceeds the CSG threshold Tcsg.

The CSG threshold Tcsg may be transmitted via a broadcast channel as a part of system information or a dedicated channel.

If a best-ranked cell found from a certain frequency is a CSG cell but a measured quality of the found CSG does not exceed the CSG threshold Tcsg, the basic priority of the found CSG cell may be maintained without assigning the implicit highest priority.

For a better understanding of the present invention, various embodiments to which the present invention can be applied will hereinafter be described in detail.

In the various embodiments, the following is assumed:

(1) The basic priorities of three frequencies, i.e., first, second and third F1, F2, and F3, are known to both a BS and a UE. The UE may select a cell at one of the first, second and third frequencies F1, F2 and F3 as a new serving cell through cell reselection;

(2) All cells are suitable cells;

(3) A serving cell on the first frequency F1 is a CSG cell and has a measured result Scsg;

(4) The CSG cell on the first frequency F1 is a best-ranked cell;

(5) The higher the measured result of a cell, the better quality the cell will be. The measured result may incorporate the offset that is specific to the measured cell and/or measured frequency;

(6) The lower the values of the priority of a frequency, the more the frequency will be prioritized. A frequency with a basic priority of 1 is considered the highest priority frequency, whereas a frequency with a priority level of 0 is considered the implicit highest priority frequency; and (7) Assumed frequency priorities are the actual priorities of frequencies to used by the UE for cell reselection.

Figure 10:
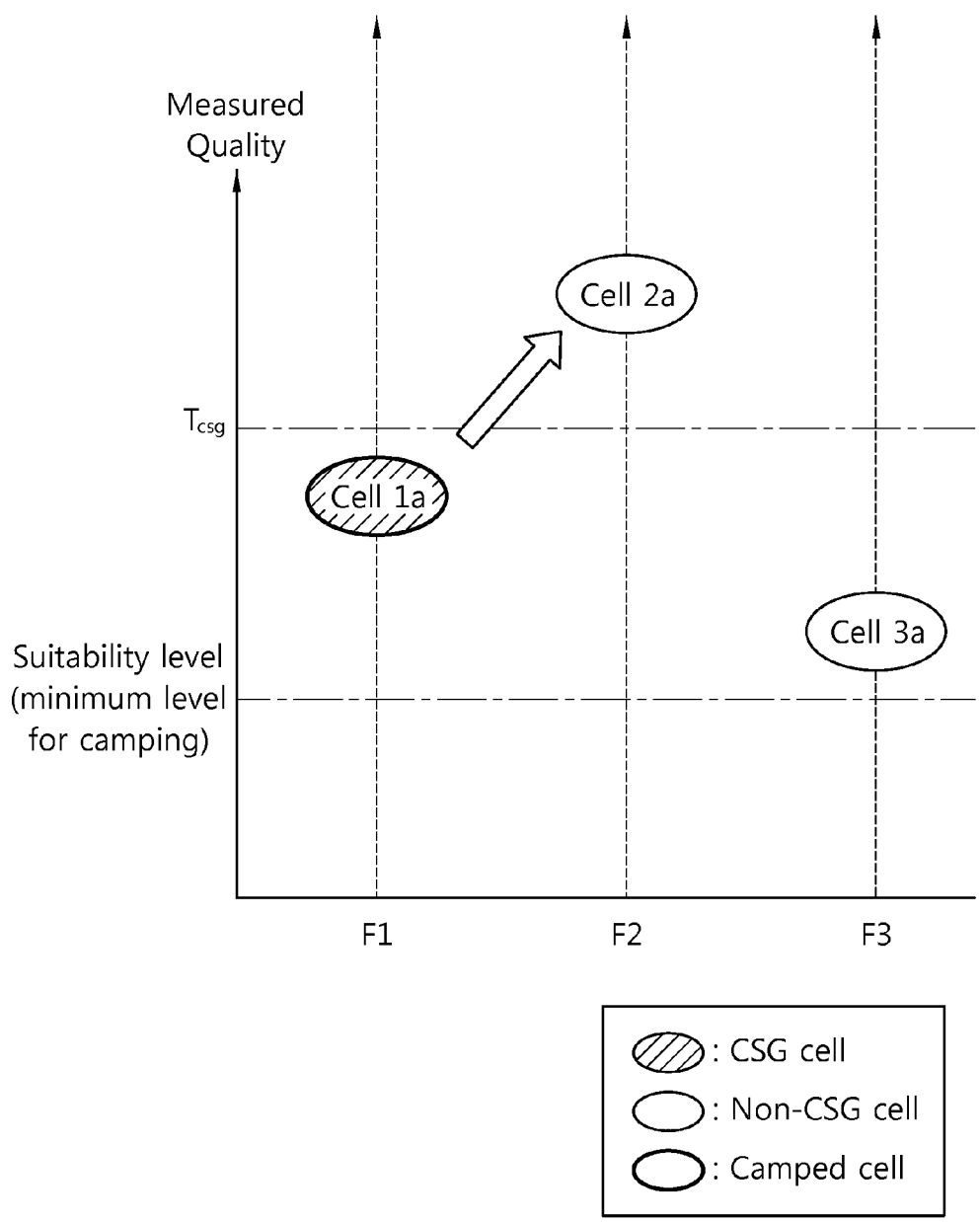
FIG. 10 illustrates an embodiment to which the present invention is applied.

FIG. 10 illustrates an embodiment to which the present invention is applied. In the embodiment of FIG. 10, the second frequency F2 has the highest priority and the first and third frequencies F1 and F3 have the same basic priorities.

The first frequency F1 is a serving frequency and a best-ranked cell at the first frequency F1, i.e., a cell 1a, is a CSG cell. Since a measured result of the cell 1a is below the CSG threshold Tcsg, the assumption of the implicit highest priority is withdrawn.

The UE performs cell reselection based on the basic priorities of the first, second and third frequencies F1, F2 and F3. Therefore, the UE may select the cell 2a at the second frequency F2, which is of a higher basic priority than the first frequency F1. The cell 2a may or may not be a CSG cell. If the cell 2a is not a CSG cell, the UE may not be able to be provided with CSG services any longer.

Table 3 compares assumed frequency priorities for the convention art and the proposed scheme.

TABLE 3

| Frequency No. | Basic Priority | Assumed Frequency Priority | |
|---|---|---|---|
| | | Conventional | Proposed |
| F1 | 3 | 0 | 3 |
| F2 | 2 | 2 | 2 |
| F3 | 3 | 3 | 3 |

Figure 11:
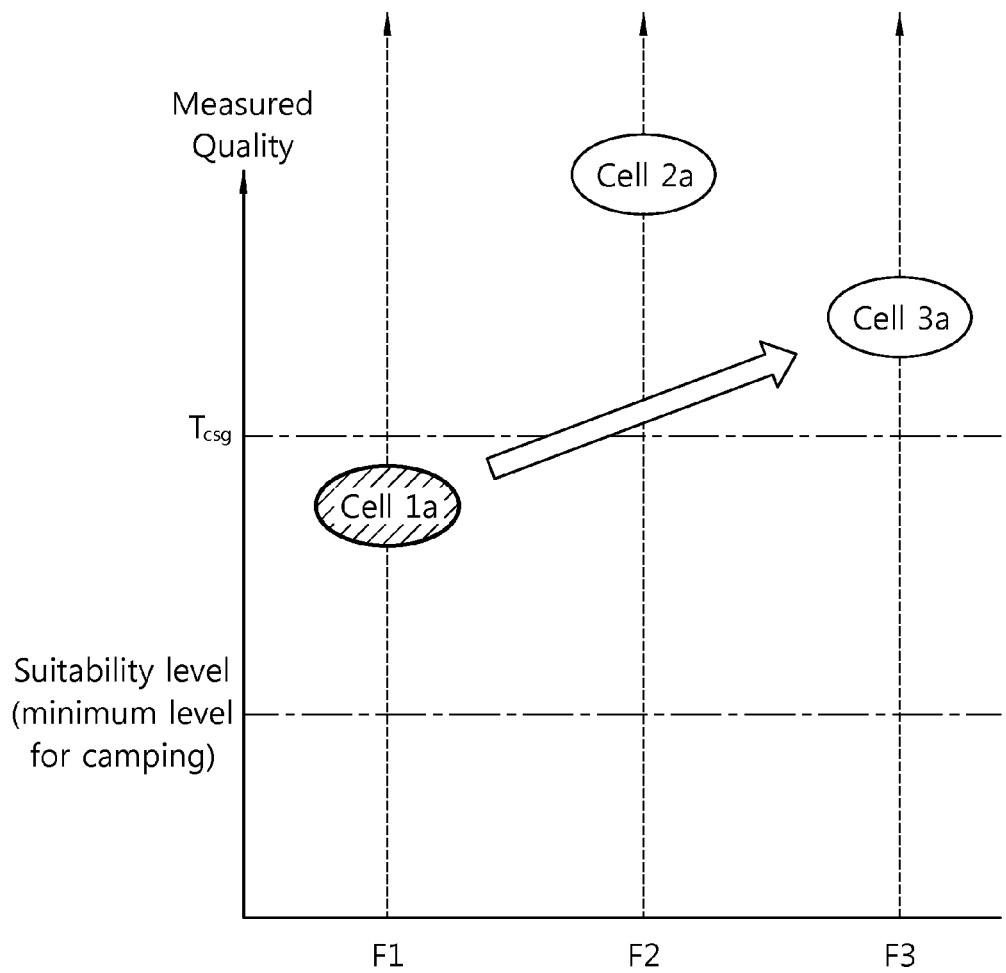
FIG. 11 illustrates another embodiment to which the present invention is applied.

FIG. 11 illustrates another embodiment to which the present invention is applied. Unlike in the embodiment of FIG. 10, the second frequency F2 has the lowest priority and the first and third frequencies F1 and F3 have the same basic priorities.

The first frequency F1 is a serving frequency and a best-ranked cell at the first frequency F1, i.e., a cell 1a, is a CSG cell. Since a measured result of the cell 1a is below the CSG threshold Tcsg, the assumption of the implicit highest priority is withdrawn.

The UE performs cell reselection based on the basic priorities of the first, second and third frequencies F1, F2 and F3. Therefore, the UE may select the cell 2a at the third frequency F3.

Table 4 compares assumed frequency priorities for the convention art and the proposed scheme.

TABLE 4

| Frequency No. | Basic Priority | Assumed Frequency Priority | |
|---|---|---|---|
| | | Conventional | Proposed |
| F1 | 3 | 0 | 3 |
| F2 | 4 | 4 | 4 |
| F3 | 3 | 3 | 3 |

Figure 12:
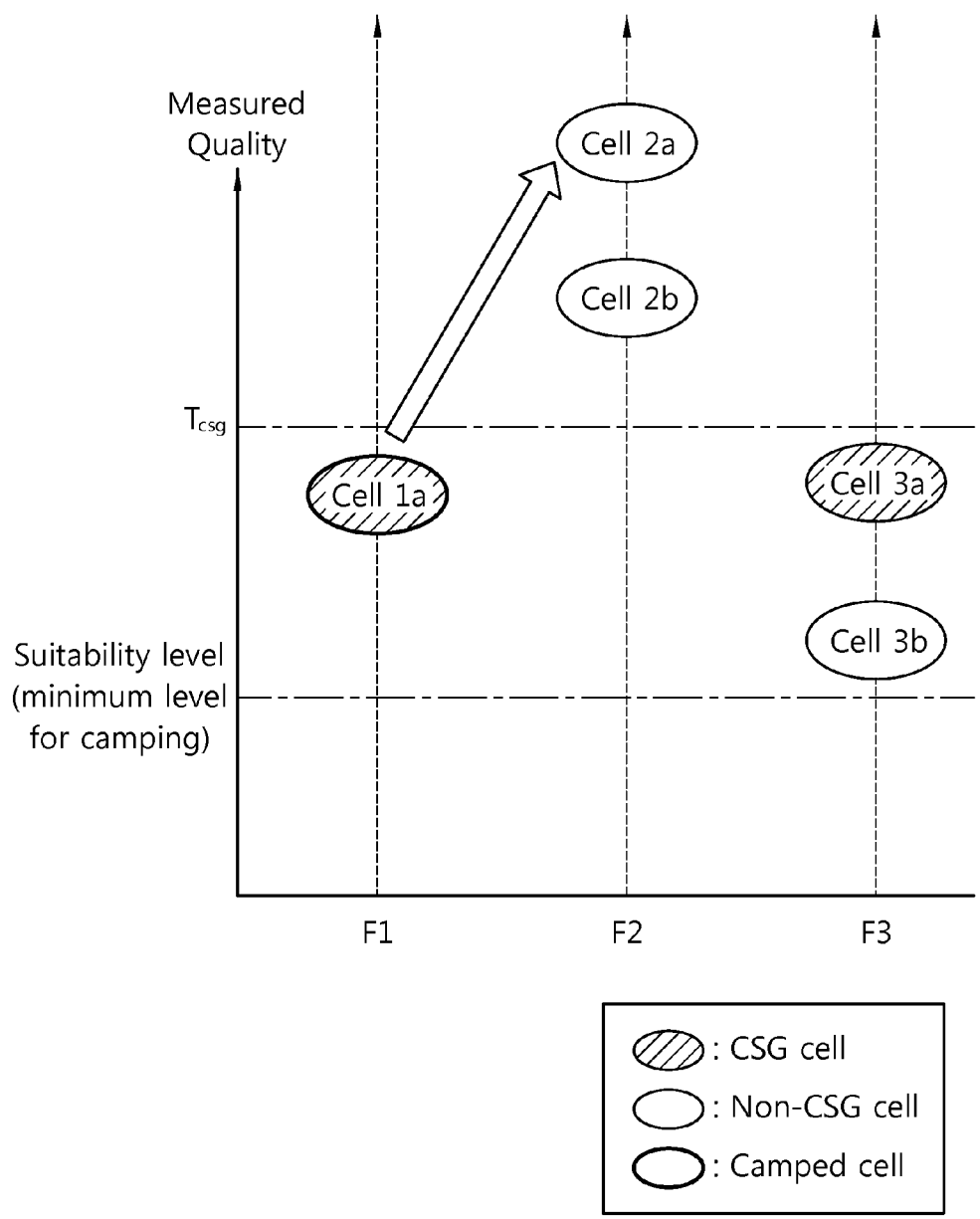
FIG. 12 illustrates still another embodiment to which the present invention is applied.

FIG. 12 illustrates still another embodiment to which the present invention is applied. Unlike in the embodiment of FIG. 10, a best-ranked cell at the third frequency F3, i.e., a cell 3a, is a CSG cell.

The first frequency F1 is a serving frequency and a best-ranked cell at the first frequency F1, i.e., a cell 1a, is a CSG cell. Since a measured result of the cell 1a is below the CSG threshold Tcsg, the assumption of the implicit highest priority is withdrawn.

Further, the best-ranked cell, i.e. cell 3a, at the third frequency F3 is a CSG cell, but the measured result of the cell 3a is below the CSG threshold Tcsg. The implicit highest priority is not assigned to the cell 3a.

As a result, the UE performs cell reselection based on the basic priorities of the first, second and third frequencies F1, F2 and F3. Therefore, the UE may select the cell 2a at the second frequency F2 which has higher basic priority than the first frequency F1. The cell 2a may or may not be a CSG cell. If the cell 2a is not a CSG cell, the UE may not be able to be provided with CSG services any longer.

Table 5 compares assumed frequency priorities for the convention art and the proposed scheme.

TABLE 5

| Frequency No. | Basic Priority | Assumed Frequency Priority | |
|---|---|---|---|
| | | Conventional | Proposed |
| F1 | 3 | 0 | 3 |
| F2 | 2 | 2 | 2 |
| F3 | 3 | 0 | 3 |

The scenario of FIG. 12 is to show that the CSG threshold Tcsg can be applied not only to a serving frequency but also to other non-serving frequency.

Figure 13:
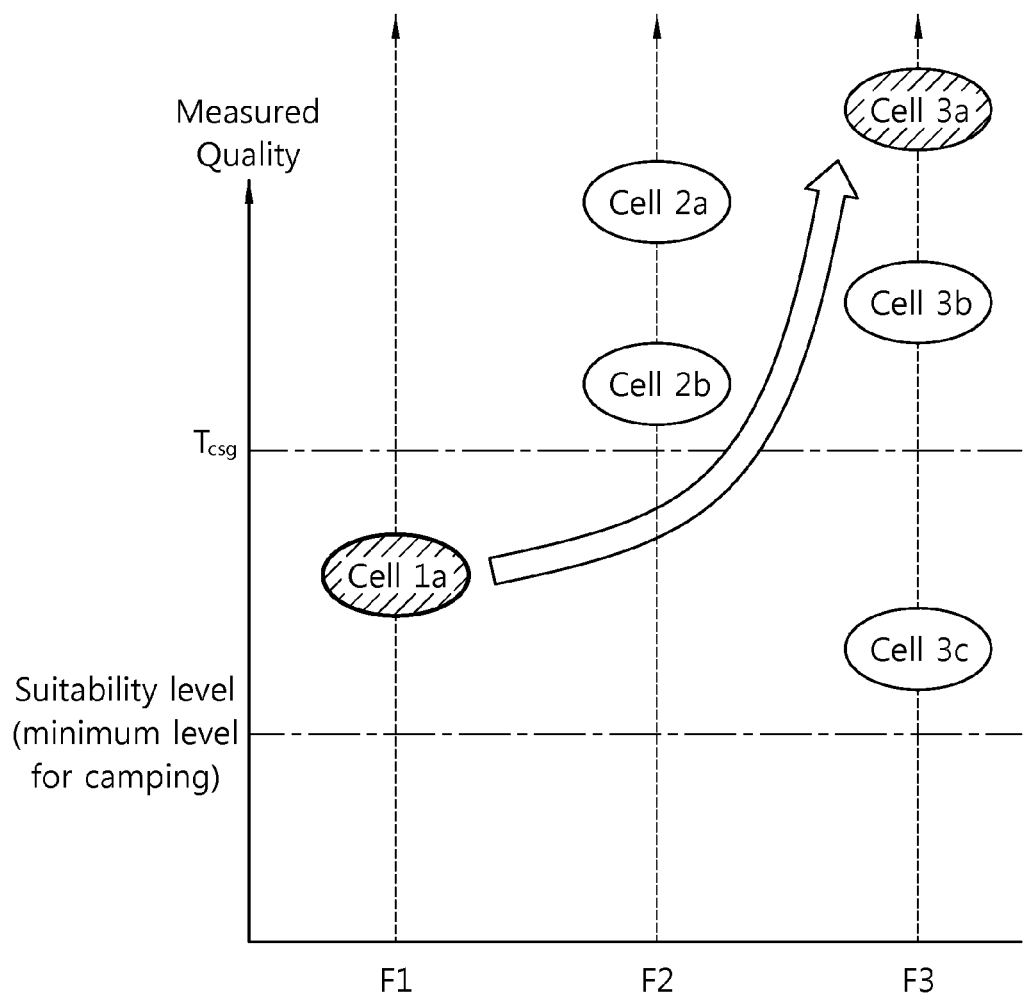
FIG. 13 illustrates still another embodiment to which the present invention is applied.

FIG. 13 illustrates still another embodiment to which the present invention is applied. Unlike in the embodiment of FIG. 12, a measured quality of a best-ranked cell at the third frequency F3, i.e., a cell 3a, is above CSG threshold Tcsg.

Similar to the embodiment of FIG. 12, the first frequency F1 is the current serving frequency and a best-ranked cell at the first frequency F1, i.e., a cell 1a, is a CSG cell. Since a measured result of the cell 1a is below the CSG threshold Tcsg, the assumption of the implicit highest priority is withdrawn.

The best-ranked cell, i.e. cell 3a, at the third frequency F3 is a CSG cell, and the measured result of the cell 3a is above the CSG threshold Tcsg. The implicit highest priority is assigned to the cell 3a.

As a result, the UE performs cell reselection based on the basic priorities of the first and second frequencies F1 and F2 and the implicit highest priority of the third frequency F3. Therefore, the UE may select the cell 3a at the third frequency F3. The UE may be able to be provided with CSG services.

Table 6 compares assumed frequency priorities for the convention art and the proposed scheme.

TABLE 6

| Frequency No. | Basic Priority | Assumed Frequency Priority | |
|---|---|---|---|
| | | Conventional | Proposed |
| F1 | 3 | 0 | 3 |
| F2 | 2 | 2 | 2 |
| F3 | 3 | 0 | 0 |

Figure 14:
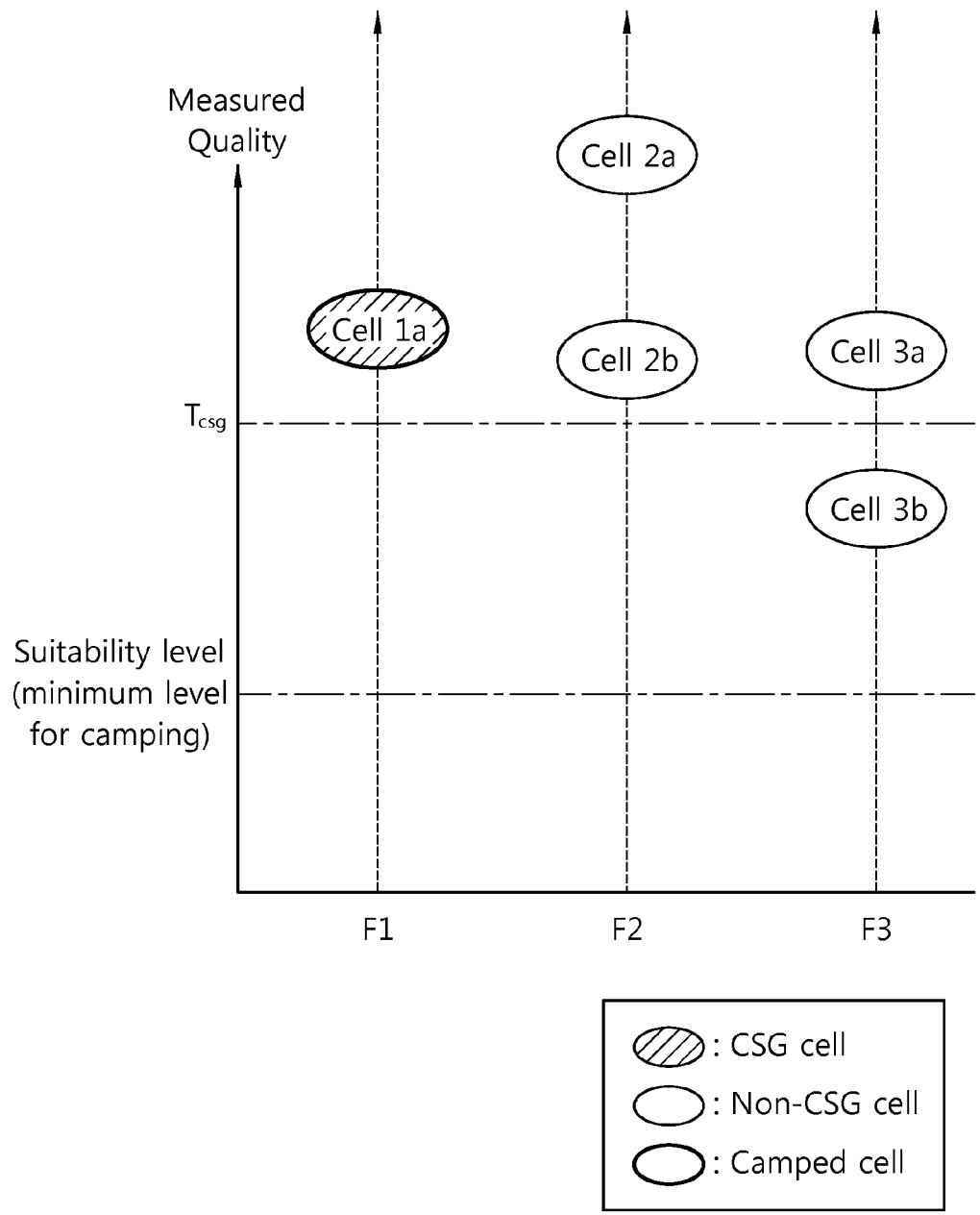
FIG. 14 illustrates still another embodiment to which the present invention is applied.

FIG. 14 illustrates still another embodiment to which the present invention is applied. A measured result of a serving cell is above CSG threshold Tcsg.

The first frequency F1 is the current serving frequency and a best-ranked cell at the first frequency F1, i.e., a cell 1a, is a CSG cell. Since a measured result of the cell 1a is above the CSG threshold Tcsg, the assumption of the implicit highest priority can be kept.

The best-ranked cell, i.e. cell 3a, at the third frequency F3 is a CSG cell, and the measured result of the cell 3a is above the CSG threshold Tcsg. The implicit highest priority is assigned to the cell 3a.

The UE can stay in its current serving cell even though there is a better-quality cell at the second frequency F2.

Table 7 compares assumed frequency priorities for the convention art and the proposed scheme.

TABLE 7

| Frequency No. | Basic Frequency Priority | Assumed Frequency Priority | |
|---|---|---|---|
| | | Conventional | Proposed |
| F1 | 3 | 0 | 0 |
| F2 | 2 | 2 | 2 |
| F3 | 3 | 3 | 3 |

The scenario of FIG. 14 is to show that the proposed scheme provides the same results as the conventional art when a measured quality of a serving CSG cell exceeds the CSG threshold Tcsg.

A UE may not necessarily prioritize a best-ranked CSG cell over other cells in cell reselection. If a serving cell of the UE is a CSG cell and the quality of the serving cell deteriorates, the UE may withdraw the implicit highest priority for the serving frequency. The UE may consider all other non-serving frequencies previously excluded from consideration as candidates for cell reselection. The UE may select a best-ranked cell from one of the non-serving frequencies as a new serving cell and may thus be able to be provided with better-quality services from the new serving cell.

Even if the serving cell is not a CSG cell and there is a better-quality CSG cell discovered from one of the non-serving frequencies, the UE may decide not to assign the implicit highest priority to the corresponding non-serving frequency if the quality of the discovered CSG cell is not sufficiently good. The quality of service can be kept by performing cell reselection toward the CSG cell only when the CSG cell can provide substantially good quality.

Figure 15:
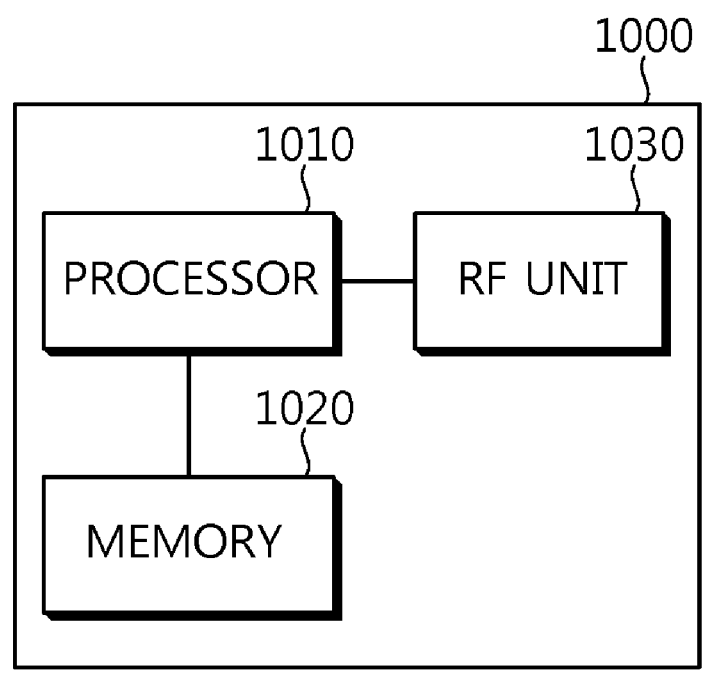
FIG. 15 is a block diagram showing a wireless apparatus to implement an embodiment of the present invention.

FIG. 15 is a block diagram showing a wireless apparatus to implement an embodiment of the present invention. This may be a part of a UE. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 51 may measure the signal strength for a plurality of frequencies and may perfrome cell selection or cell reselection based on the measured results The memory 1020 is operatively coupled with the processor 51 and stores priorites for cell selection.

The RF unit 1030 is operatively coupled with the processor 11, and transmits and/or receives a radio signal.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A wireless apparatus for performing cell selection in a wireless communication system, the apparatus comprising:
    a radio frequency (RF) unit configured to transmit and receive radio signals;
    a memory configured to store basic priorities for a plurality of frequencies; and
    a processor connected to the RF unit and the memory and configured to:
        implement a radio interface protocol;
        measure a signal strength of at least one cell in at least one of the plurality of frequencies;
        perform cell selection based on an overrided priority, if a cell operating on a frequency with a highest measured signal strength for the frequency is a closed subscriber group (CSG) cell and the highest measured signal strength is greater than a CSG threshold; and
        perform cell selection based on the basic priorities, if the cell is the CSG cell and the highest measured signal strength is less than the CSG threshold or if the cell is not CSG cell,
    wherein the overrided priority overrides the basic priorities by allocating a highest priority to the particular frequency.

2. The apparatus of claim 1, wherein the at least one cell includes a serving cell and a neighboring cell.

3. The apparatus of claim 2, wherein the serving cell is a CSG cell.

4. The apparatus of claim 1, wherein the basic priorities are received from a base station (BS).

5. The apparatus of claim 1, wherein the cell selection based on the overrided priority comprises selecting the cell as a target cell.

6. The apparatus of claim 5, wherein the cell selection based on the stored basic priorities comprises selecting a cell with a highest measured signal strength among at least one cell in a frequency having a highest priority of the basic priorities as the target cell.

7. A method of performing cell selection in a wireless communication system, the method comprising:
    configuring, by a user equipment (UE), basic priorities for a plurality of frequencies;
    measuring, by the UE, a signal strength of at least one cell for at least one of the plurality of frequencies;

performing cell selection based on an overrided priority if a cell operating on a frequency with a highest measured signal strength for the frequency is a closed subscriber group (CSG) cell and the highest measured signal strength is greater than a CSG threshold; and performing cell selection based on the stored basic priorities, if the cell is the CSG cell and the highest measured signal strength is less than the CSG threshold or if the cell is not the CSG cell, wherein the overrided priority overrides the basic priorities by allocating a highest priority to the particular frequency.

8. The method of claim 7, wherein the at least one cell includes a serving cell and a neighboring cell.

9. The method of claim 8, wherein the serving cell is a CSG cell.

10. The method of claim 7, wherein configuring the basic priorities comprises receiving the basic priorities from a base station (BS).

11. The method of claim 7, wherein the performing cell selection based on the overrided priority comprises selecting the cell as a target cell.

12. The method of claim 11, wherein the performing cell selection based on the stored basic priorities comprises selecting a cell with a highest measured signal strength among at least one cell in a frequency having a highest priority of the basic priorities as the target cell.

* * * * *